United States Patent [19]
Takayama et al.

[11] Patent Number: 5,282,208
[45] Date of Patent: Jan. 25, 1994

[54] DATA TRANSFER SYSTEM AND METHOD

[75] Inventors: Akira Takayama; Masanori Ohashi; Hitoshi Makita, all of Hamamtsu, Japan

[73] Assignee: Yamaha Corporation, Japan

[21] Appl. No.: 686,781

[22] Filed: Apr. 17, 1991

[30] Foreign Application Priority Data

Apr. 17, 1990 [JP] Japan .................................. 2-101226

[51] Int. Cl.$^5$ ................................................ H04J 3/12
[52] U.S. Cl. ............................................................ 370/110.1
[58] Field of Search ..................... 370/110.1, 60, 60.1, 370/94.1, 94.2; 375/7, 8

[56] References Cited

U.S. PATENT DOCUMENTS

| | | | |
|---|---|---|---|
| 4,464,650 | 8/1984 | Eastman et al. | 341/51 |
| 4,642,758 | 2/1987 | Teng | 395/600 |
| 4,675,807 | 6/1987 | Gourneau et al. | 395/275 |
| 4,680,773 | 7/1987 | Amundson | 375/8 |
| 4,802,220 | 1/1989 | Marker, Jr. | 380/33 |
| 4,953,180 | 8/1990 | Fieschi et al. | 375/8 |
| 5,012,470 | 4/1991 | Shobu et al. | 370/94.1 |
| 5,050,005 | 9/1991 | Kagami | 370/110.1 |
| 5,056,088 | 10/1991 | Price et al. | 370/110.1 |

FOREIGN PATENT DOCUMENTS

| | | |
|---|---|---|
| 0283735 | 9/1988 | European Pat. Off. . |
| 1322901 | 7/1973 | United Kingdom . |

Primary Examiner—Wellington Chin
Attorney, Agent, or Firm—Scully, Scott, Murphy & Presser

[57] ABSTRACT

In a digital network system, such as ISDN (Integrated Service Digital Network) system, a data link is established between transmit-side and receive-side stations so that a data transfer is performed onto a public telephone line in accordance with a predetermined protocol. The transmit-side station compresses data read from a storage medium and then transfers compressed data to the receive-side station, while the receive-side station expands the compressed data and then writes it into a storage medium. Before transferring the compressed data, the transmit-side station transmits a data transfer request to the receive-side station, so that if the receive-side station is now ready to receive the compressed data, the transmit-side station transfers the compressed data to the receive-side station. On the other hand, when completing a data transfer, the transmit-side station transmits an end request of data transfer to the receive-side station, so that if the receive-side station is now in a state to respond to a data transfer completion, the data link formed between the transmit-side and receive-side stations is terminated. Herein, the whole storage area of the storage medium is divided into plural storage blocks, so that the data transfer is performed with respect to each storage block. Preferably, the storage medium is a floppy disk, so that each storage block corresponds to each track formed on the floppy disk.

14 Claims, 7 Drawing Sheets

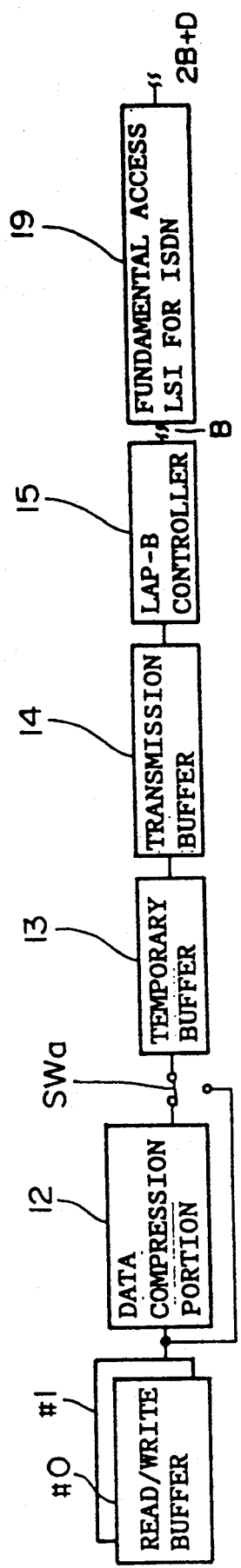
FIG. 3 A (TRANSMIT-SIDE SYSTEM)
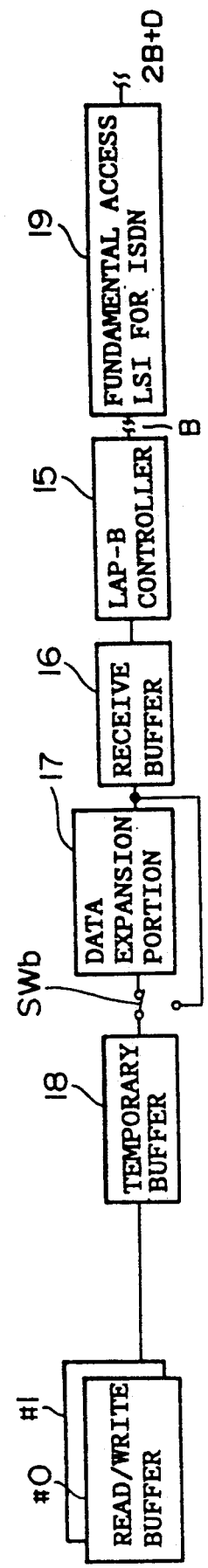
FIG. 3 B (RECEIVE-SIDE SYSTEM)

(COMMON DATA FORMAT)

(END REQUEST)

(START REQUEST)

(END RESPONSE)

(START RESPONSE)

(NORMAL DATA)

(DATA TRANSFER SEQUENCE FOR TRANSMIT-SIDE SYSTEM)

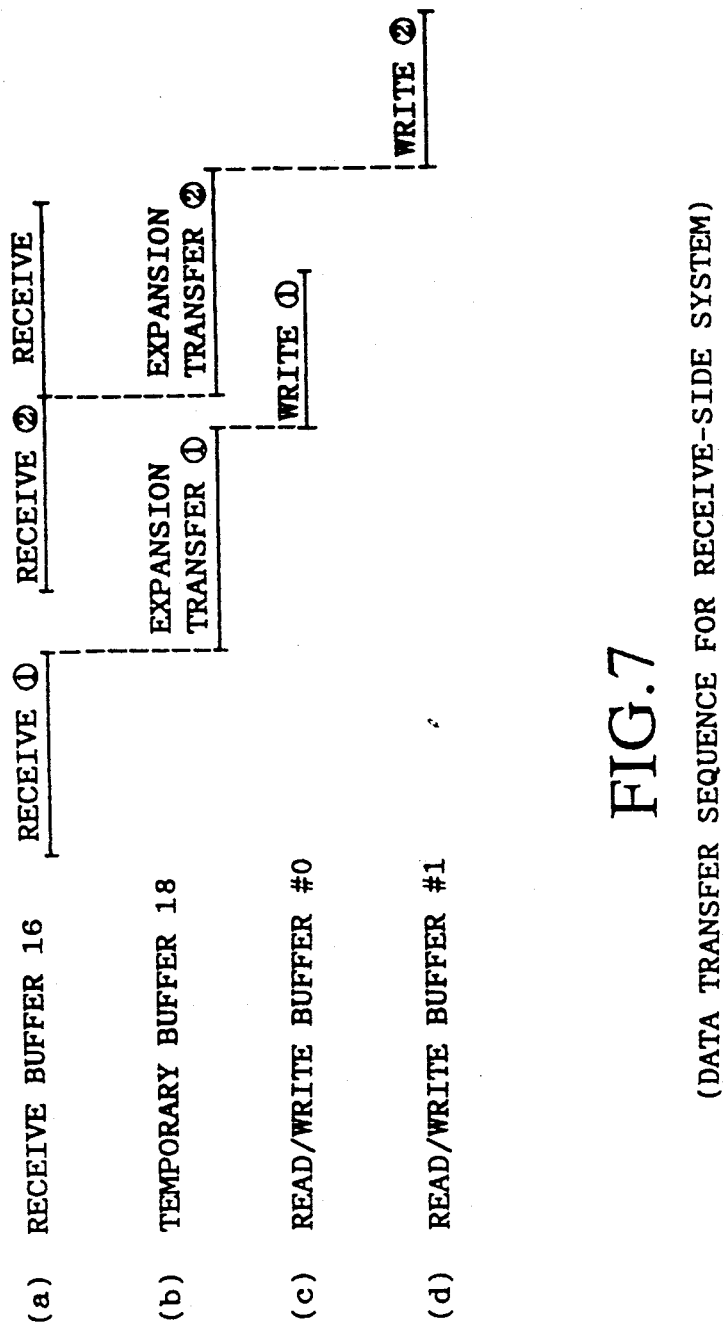

DATA TRANSFER SYSTEM AND METHOD

BACKGROUND OF THE INVENTION

The present invention relates to a data transfer method by which digital information stored in a storage medium is transferred to a remote place via a digital network.

According to an example of the conventional data transfer method by which digital information is transferred on a public line to a remote place, each of the transmit-side and receive-side provides a modulator-demodulator (i.e., MODEM). Herein, MODEM at the transmit-side converts the digital information into an analog signal, which is then transmitted toward to the receive-side. Then, a MODEM at the receive-side decodes the analog signal into the digital information.

Meanwhile, in the above-mentioned data transfer method wherein the digital information is transferred in the form of the analog signal, it takes a very long time to transfer much information stored in a storage medium such as a floppy disk. For this reason, there is provided another data transfer method in which the digital information is transferred in the form of a digital signal. However, there is no data transfer method which is optimum to the public network system, i.e., so-called "ISDN" (Integrated Service Digital Network).

SUMMARY OF THE INVENTION

Accordingly, it is a primary object of the present invention to provide a data transfer method by which much information can be transferred to a remote place via ISDN with a short period of time.

It is another object of the present invention to provide a data transfer method which can be implemented with relatively low price but with high reliability.

According to a first aspect of the present invention, in a data transfer method wherein a data link corresponding to B channel is established between first and second stations which are connected together by a digital network corresponding to ISDN (i.e., Integrated Service Digital Network) system so that a transmission control is made on a data transfer operation performed between the first and second stations in accordance with a predetermined LAP-B protocol, there is provided a data transfer method comprising steps of:

transmitting a first I-Frame (i.e., Information Frame), representing a data transfer request, from the first station which functions as a transmit-side station to the second station which functions as a receive-side station;

transmitting a second I-Frame, representing a response to the data transfer request, to the first station from the second station which is now ready to perform a data transfer in response to the data transfer request;

sequentially reading out data from a first storage medium provided at the first station in response to the second I-Frame, compressing read-out data, and then transferring compressed data and an I-Frame of normal data, having information representing a data length and a transmission data number with respect to the compressed data, to the second station;

extracting the compressed data from the I-Frame of normal data received in the second station, expanding the compressed data, and thereby writing it into a second storage medium provided at the second station;

transferring a third I-Frame for end request of data transfer to the second station from the first station which completes the data transfer;

then transferring a fourth I-Frame for end response of data transfer to the first station from the second station which responds to the end request of data transfer;

thus, terminating the data link corresponding to B channel.

According to a second aspect of the present invention, in a data transfer system to be adapted to a digital network system wherein a data link can be arbitrarily established or terminated between two stations so that a data transfer is performed between the two stations in accordance with a predetermined protocol, there is provided a data transfer system including:

a transmit-side station which compresses data read from a storage medium to thereby transfer compressed data; and a receive-side station which expands the compressed data transferred thereto from the transmit-side station and then write it into a storage medium, wherein before transferring the compressed data, the transmit-side station transmits a data transfer request to the receive-side station, so that if the receive-side station is now ready to receive the compressed data, the transmit-side station transfers the compressed data to the receive-side station, while when completing a data transfer, the transmit-side station transmits an end request of data transfer to the receive-side station, so that if the receive-side station is now in a state to respond to a data transfer completion, the data link formed between the transmit-side and receive-side stations is terminated.

BRIEF DESCRIPTION OF THE DRAWINGS

Further objects and advantages of the present invention will be apparent from the following description, reference being had to the accompanying drawings wherein a preferred embodiment of the present invention is clearly shown.

In the drawings:

FIGS. 3A, 3B are block diagrams each showing a detailed configuration of en essential part of the FD transfer unit shown in FIG. 2;

FIGS. 6 and 7 are data transfer sequences for explaining a data transfer procedure according to an embodiment of the present invention.

DESCRIPTION OF A PREFERRED EMBODIMENT

Figure 1:
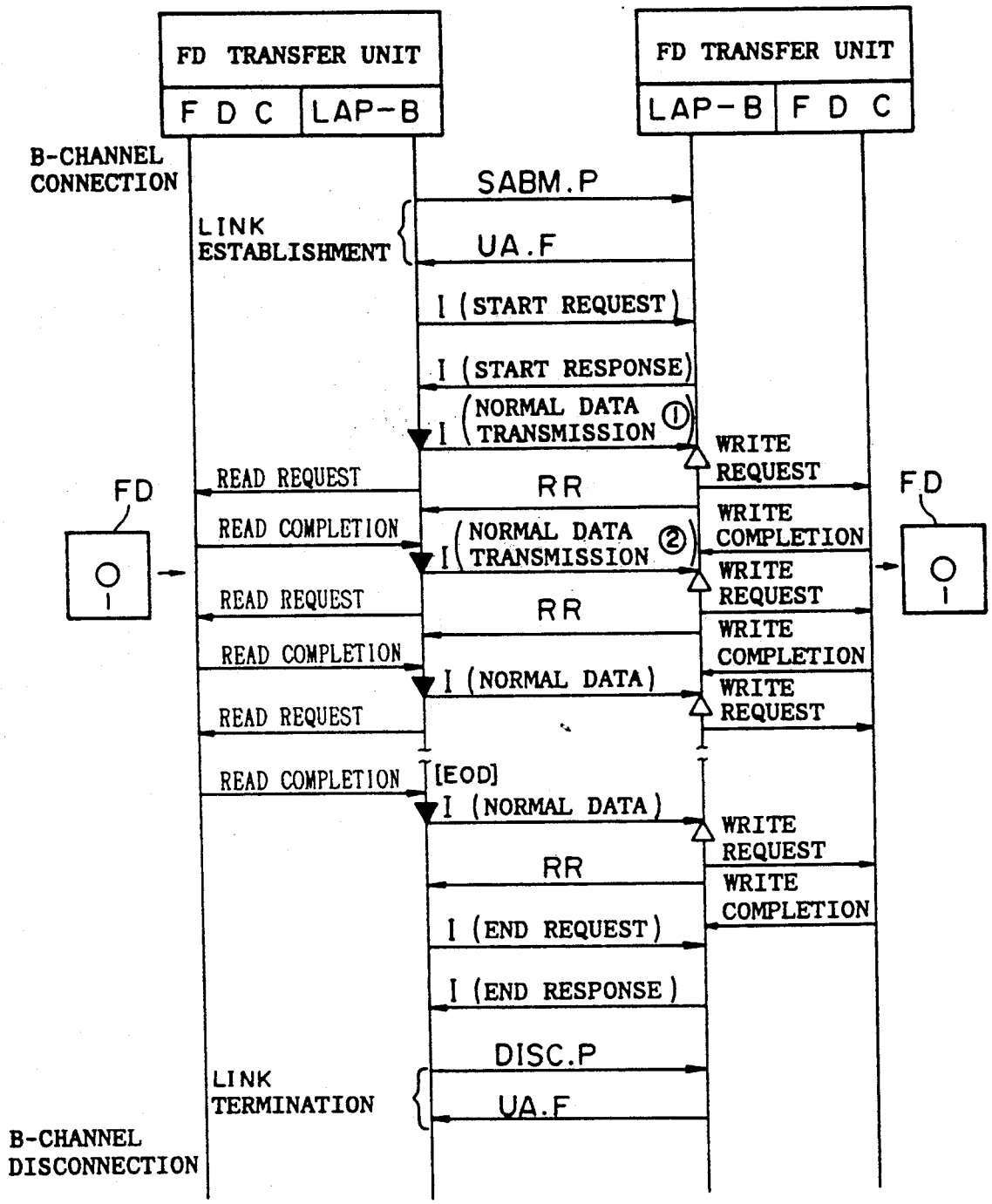
FIG. 1 is a sequence diagram showing a data transfer protocol for explaining a data transfer method according to an embodiment of the present invention.

Next, description will be given with respect to a preferred embodiment of the present invention by referring to the drawings, wherein like reference characters designate like or corresponding parts throughout the several views.

[A] Configuration

Figure 2:
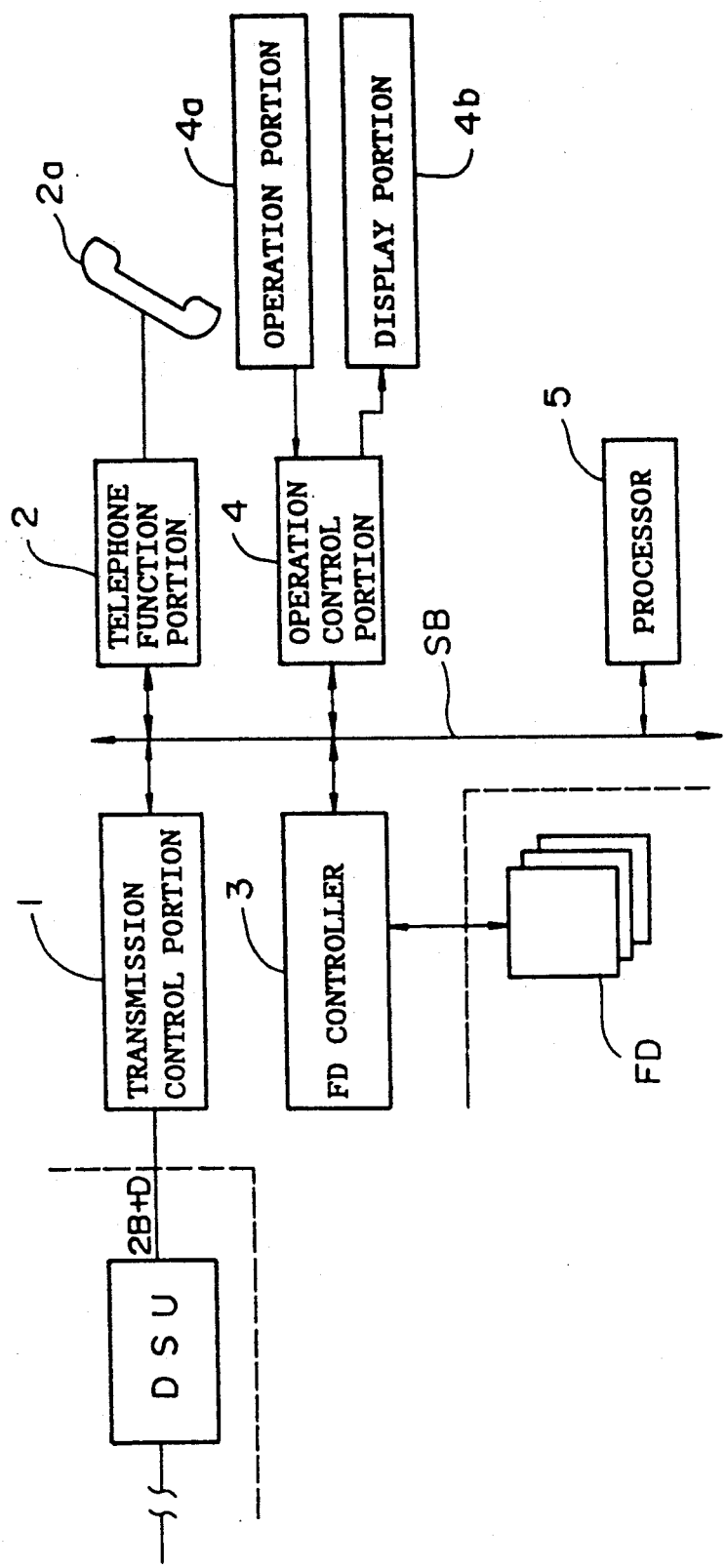
FIG. 2 is a block diagram showing a hardware configuration of a FD transfer unit.

First, description will be given with respect to the configuration of an embodiment of the present invention. FIG. 1 is a sequence diagram (i.e., FD transfer protocol, where "FD" designates a floppy disk) used for explaining a data transfer method according to an embodiment of the present invention. FIG. 2 is a block diagram showing a FD transfer unit having a FD transfer function to be performed in accordance with the procedure as shown in FIG. 1.

In FIG. 2, 1 designates a transmission control portion which controls the connection/disconnection of line, data link establishment/termination of D-channel, B-channel and signal transmission. Herein, "D-channel" is defined as a signal channel having a transfer rate of 16 or 64 Kbit/sec, while "B-channel" is defined as a channel, used for a telephone service, having a transfer rate of 64 Kbit/sec. In addition, 2 designates a telephone function portion coupled with a telephone receiver 2a. When one subscriber makes an oral communication with the other subscriber, this telephone function portion 2 performs a transmission control of an audio signal and also performs a conversion control between the analog signal and digital signal. A FD controller 3 (hereinafter, simply referred to as FDC) performs a read/write control on a floppy disk (FD). An operation control portion 4 detects an operation of several kinds of operation button switches (not shown) provided on an operation portion 4a, thereby generating and then transferring corresponding operation information to several portions in the circuitry. In addition, the operation control portion 4 controls a display portion 4b to display a message supplied from several portions. A processor 5 is designed to control operations of the FD transfer unit as a whole. Further, SB designates a system bus by which data transfer is made among the transmission control portion 1, telephone function portion 2, FDC 3, operation control portion 4 and processor 5.

FIGS. 3A, 3B respectively show hardware configurations of a transmit-side system and a receive-side system employed in the transmission control portion 1. In FIG. 3A, each of #0, #1 designates a read/write buffer, which is used to temporarily store the data read from the FD and also used to temporarily store the other data to be written into the FD under control of the FDC 3. Herein, 12 designates a data compression portion which compresses the data read from the read/write buffers #0, #1 in accordance with the predetermined algorithm. 13 designates a temporary buffer which temporarily stores the data to be transmitted therefrom. In addition, a switch SWa is provided at an input side of the temporary buffer 13. When transferring the data read from the FD in an compressed manner, the switch SWa is switched such that the temporary buffer 13 is connected to the data compression portion 12 via the switch SWa. On the other hand, when directly transferring the data in an uncompressed manner, the switch SWa is switched such that the temporary buffer 13 is connected to the read/write buffers #0, #1 via the switch SWa.

In addition, 14 designates a transmission buffer, and 15 designates a LAP-B controller which supports the LAP-B protocol (i.e., balanced link access protocol) based on the recommendation X.25 of CCITT (i.e., Consultative Committee International Telegraph and Telephone).

The above-mentioned CCITT, which is the consultative committee for the International Telecommunication Union (ITU) to work for the international standardization for the telecommunication system, recommends to use the technical terminology to be standardized. Herein, "LAP-B protocol (i.e., Link Access Procedure Balanced protocol)" is set as one of link access protocols by which the data transfer is performed between "DCE" (i.e., Data Circuit terminating Equipment) and "DTE" (i.e., Data Terminal Equipment) to be linked together by the data communication network. In other words, this protocol is defined as the protocol by which the data and control information are transferred via OSI (i.e., Opened System Interconnection). In short, this protocol indicates the balanced link access procedure corresponding to "ABM" (i.e., Asynchronous Balanced Mode) within the "HDLC procedures" (i.e., High Level Data Link Control procedures) which are employed by "ISO" (i.e., International Organization for Standardization).

This LAP-B controller 15 performs an establishment/termination of the data link, formed between two subscribers, on B channel and it also performs a transmission control. The data stored in the temporary buffer 13 is built in I-Frame (i.e., Information Frame) having the format based on the LAP-B protocol.

Herein, detailed a description will be given with respect to the above-mentioned "I-Frame". It may be well known that "frame" is defined as a piece of information sandwiched by flags. According to the foregoing recommendation X.25 of CCITT, "I-Frame" is defined as the frame to be used for transferring the upper-link-level information. This I-Frame comprises the address portion "A" (8 bits), control field portion "C" (8 bits) for the distinction of the frame type, information field portion "Info" and frame check sequence "FCS" (16 bits), which are sandwiched by flags each consisting of 8-bit data "01111110".

Such data is written in the transmission buffer 14, built in HDLC-Frame (i.e., High Level Data Link Control Frame) in the LAP-B controller 15, and then outputted onto B channel via a fundamental access LSI 19 for ISDN which manages layers 1, 2. Thereafter, outputted HDLC-Frame is transferred to a digital network via DSU (i.e., Digital Service Unit).

Next, a description will be given with respect to the receive-side system by referring to FIG. 3B. Herein, HDLC-Frame, which is received by the digital network and passed through the LSI 19, is divided by the LAP-B controller 15 in the receive-side system, thereby obtaining I-Frame to be written into a receive buffer 16. In addition, 17 designates a data expansion portion which expands the data written in the receive buffer 16. Further, 18 designates a temporary buffer. Herein, a switch SWb is provided at an input side of this temporary buffer 18. When receiving the compressed data, this switch SWb is switched such that the data expansion portion 17 is connected to the temporary buffer 18 via the switch SWb. On the other hand, when receiving the non-compressed data, the switch SWb is switched such that the receive buffer 16 is connected to the temporary buffer 18 via the switch SWb. The data to be stored in the temporary buffer 18 is once written into the read/write buffers #0, #1, and then finally written into the FD under control of the FDC 3.

The FD transfer unit according to the present embodiment further provides a FD transfer protocol, which regulates the procedure for the data stored in FD, as an upper protocol of the LAP-B protocol. Herein, the processor 5 executes control programs in accordance with the FD transfer protocol stored in a read-only memory (ROM, not shown), thereby controlling the FDC 3 and transmission control portion 1.

[B] Data Transfer Procedure

Figure 6:
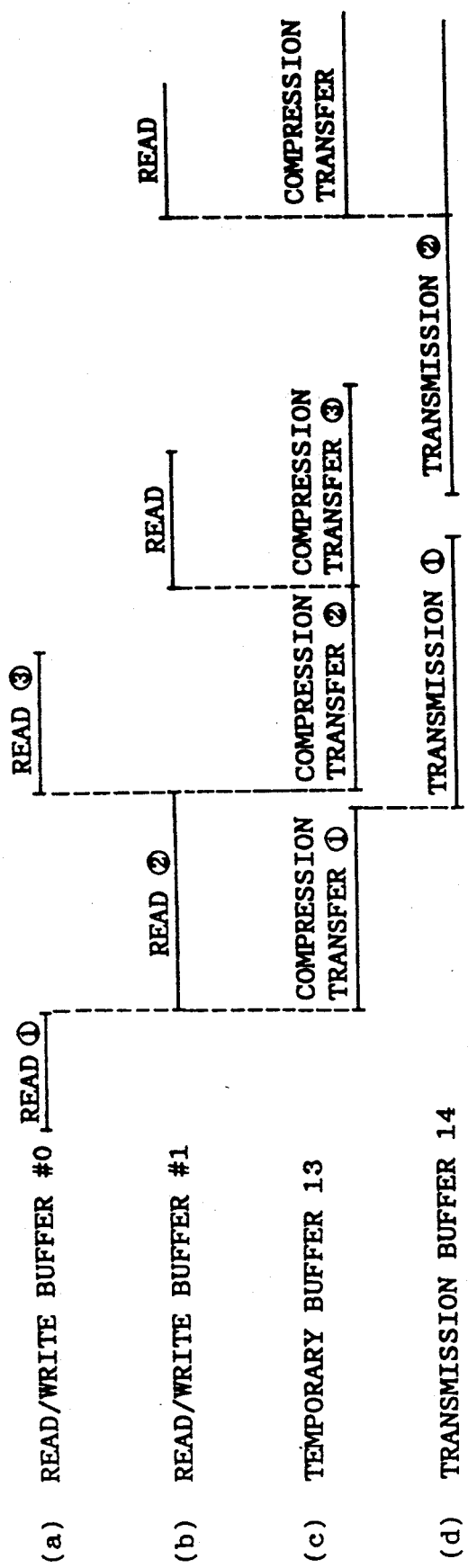

Next, description will be given with respect to a data transfer procedure for the FD stored data in the present embodiment described above. Incidentally, FIGS. 6, 7 respectively illustrate data transfer sequences to be performed in the data transfer period at the transmission control portions 1 in the transmit-side system and receive-side system of the FD transfer unit.

At first, the transmit-side subscriber operates the predetermined operation button switches (e.g., ten-key switches) provided on the operation portion 4a, thereby entering a telephone number of the receive-side subscriber. Such telephone number information is read by the operation control portion 4, and then transmitted on the system bus SB to the transmission control portion 1. As a result, the transmission control portion 1 performs a line connection process to be executed between two subscribers via the digital network. After completing the line connection, the subscriber can make an oral communication with another subscriber by the telephone receiver 2a.

Next, the subscriber operates the predetermined operation button switches (e.g., start button switch) to thereby input the FD data transfer command. This command is inputted into the processor 5 via the operation control portion 4 and system bus SB. Then, the processor 5 transmits first read request to the FDC 3. As a result, the FDC 3 reads the data stored in first track of the FD (hereinafter, simply referred to as 1st-track-data). This data is written into the read/write buffer (e.g., #0, which is at write enable state) (see "READ ①" in FIG. 6(a)). When compression mode is designated, the above-mentioned 1st-track-data written in the read/write buffer #0 is compressed by the data compression portion 12, so that the compressed data is passed through the switch SWa and then written into the temporary buffer 13 (see "COMPRESSION TRANSFER ①" in FIG. 6(c)). On the other hand, in a non-compression mode, the 1st-track-data written in the read/write buffer #0 is passed through the switch SWa and then directly written into the temporary buffer 13.

In parallel with "COMPRESSION TRANSFER ①", 2nd-track-data of the FD is read under control of the FDC 3 and then written into the read/write buffer #1 (see "READ ②" in FIG. 6(b)). After completing "COMPRESSION TRANSFER ①", based on the compressed 1st-track-data accumulated in the temporary buffer 13, I-Frame of normal data is established and then written into the transmission buffer 14. Thus, the present FD transfer unit is set in a standby state for transferring the 1st-track-data of FD. When completing both of "COMPRESSION TRANSFER ①" and "READ ②", it starts to compress the 2nd-track-data stored in the read/write buffer #1 (see "COMPRESSION TRANSFER ②" in FIG. 6(c)).

In parallel with a series of operations described above, the processor 5 supplies a request command for data link establishment to the LAP-B controller 15, which thereby requests the data link establishment in ABM mode (i.e., Asynchronous Balanced Mode). In addition, the LAP-B controller 15 generates a SABM.P command (i.e., SABM command of which poll (P) bit, for use in response request in ABM, is set at "1") for requesting a response at the receive-side, which is transferred to the receive-side FD transfer unit.

In the case where the receive-side FD transfer unit can respond to the communication in the ABM mode, it transfers a UA.F command (i.e., Unnumbered Acknowledgement command of which final (F) bit, for use in response permission, is set at "1"). Thus, a data link using B channel is established between the transmit-side and receive-side FD transfer units, which enables the I-Frame transmission.

Figure 4:
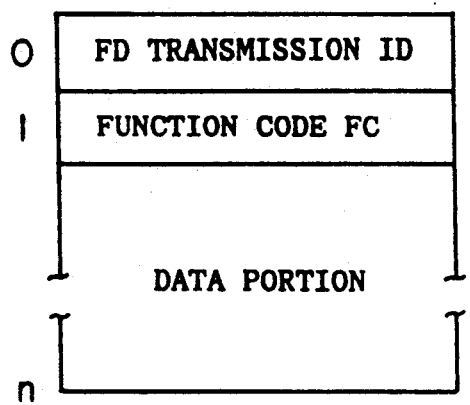
FIGS. 4A to 4F are drawings each showing a data configuration used in an embodiment of the present invention.
Figure 4:
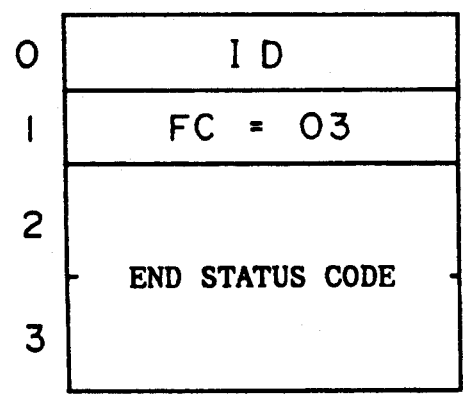
Figure 4:
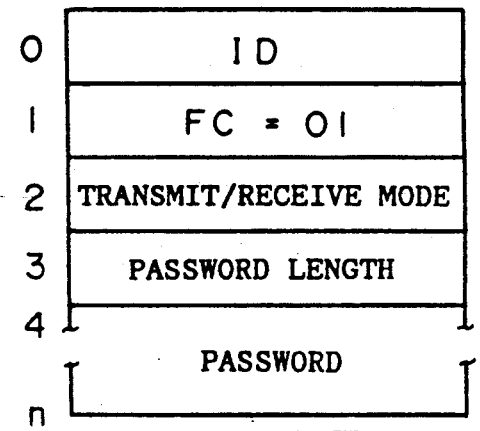
Figure 4:
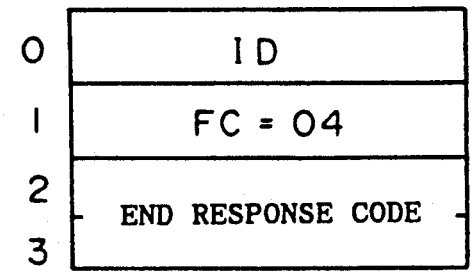
Figure 4:
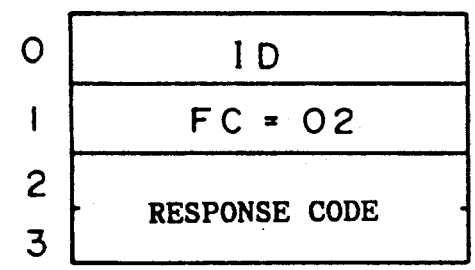
Figure 4:
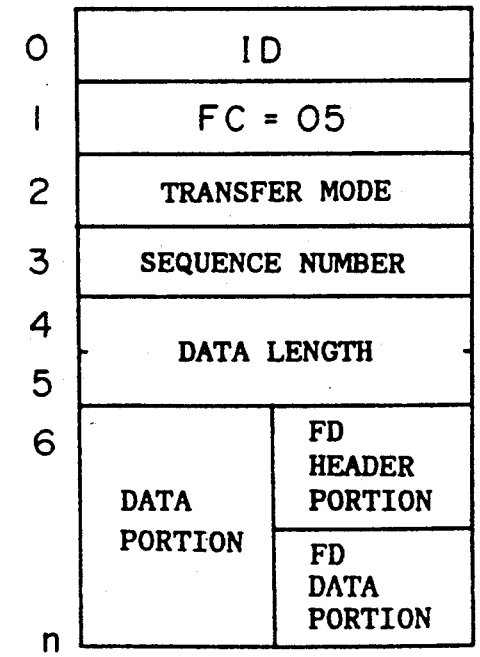

FIG. 4A shows a common data format for I-Frame in the FD transfer protocol. As shown in FIG. 4A, each I-Frame consists of ID (i.e., identifier), function code FC and data portion. Herein, all of the I-Frames concerning the FD stored data transfer are designated by the same ID, e.g., (5A)H.

After completing the data link establishment, the LAP-B controller 15 assembles the HDLC-Frame, of which the I-Frame is set as the start request command, and the HDLC-Frame is then transferred to the receive-side FD transfer unit. As shown in FIG. 4B, this I-Frame consists of ID, function code FC=(01)H which defines that the present I-Frame functions as a start request for the FD stored data transfer, transmit/-receive mode flag which designates one of the transmit request and receive request, password length and password. In this case where the transmit-side FD transfer unit will transmit the I-Frame for start request command, the transmit/receive mode flag is set at the value corresponding to the transmit request.

The above-mentioned HDLC-Frame is received by the receive-side FD transfer unit, in which the LAP-B controller 15 extracts the I-Frame for start request command. When a certain password is preset, a determination is made whether or not the present receive-side FD transfer unit corresponds to such password for communication permission. Then, a determination is made whether or not the FDC 3 in the receive-side FD transfer unit can be used. Thereafter, the LAP-B controller 15 transmits the HDLC-Frame to the foregoing transmit-side FD transfer unit, wherein I-Frame of the HDLC-Frame is set as the start response. As shown in FIG. 4C, this I-Frame for start response consists of function code FC=(02)H and response code, wherein the function code defines that the I-Frame functions as a response to the start request for the FD data transfer.

The above-mentioned I-Frame for the start response is inputted into the LAP-B controller 15 in the transmit-side FD transfer unit, wherein the response code is extracted. Based on the response code, a determination is made whether or not the receive-side FD transfer unit is in a receive enable state. When a determination is made that the receive-side FD transfer unit is in the receive enable state, the processor 5 supplies a transmission command to the LAP-B controller 15, by which the I-Frame transmission of normal data is made by use of the compressed 1st-track-data stored in the transmission buffer 14. As a result, the LAP-B controller 15 reads the data stored in the transmission buffer 14, thereby assembling the HDLC-Frame, which is transferred to the receive-side FD transfer unit (see "TRANSMISSION ①" in FIG. 6(d)). Accompanying the start of "TRANSMISSION ①", the read request is transmitted to the FDC 3. At this time, if the FDC 3 is now operating to read the data from the FD, read-out operation for 3rd-track-data is started (see "READ ③"

in FIG. 6(a)) at a time when completing such operation of the FDC 3 (i.e., at an end timing of "READ ②" in FIG. 6(b)).

Next a detailed description will be given with respect to the configuration of the I-Frame of normal data. Herein, "normal data" is defined as the normally used, general data stored in the storage medium, other than the control data of I-Frame. As shown in FIG. 4F, the I-Frame of normal data consists of ID, function code FC=(05)H representing that the present frame corresponds to a transfer frame of the normal data, transfer mode information, sequence number, data length used for designating the length of data and data portion. Further, the data portion consists of FD header portion and FD data portion, wherein FD data portion contains compressed data of one track. Herein, the MSB (i.e., most significant bit) of the transfer mode information is used as a flag by which it is designated whether or not the compression is carried out on the transfer data. In response to the compression/non-compression, this flag is set at "1"/"0". In addition, LSB (i.e., least significant bit) of the transfer mode information is used as a flag by which it is designated whether or not the verify operation is carried out. In response to whether or not the verify operation is carried out on the receive-side FD transfer unit, this flag is set at "1"/"0". Herein, the verify operation designates an operation to collate the data written in the FD with the received data when the received data is to be written into the FD. In addition, the track number for the transfer data is set as the sequence number.

Figure 5:
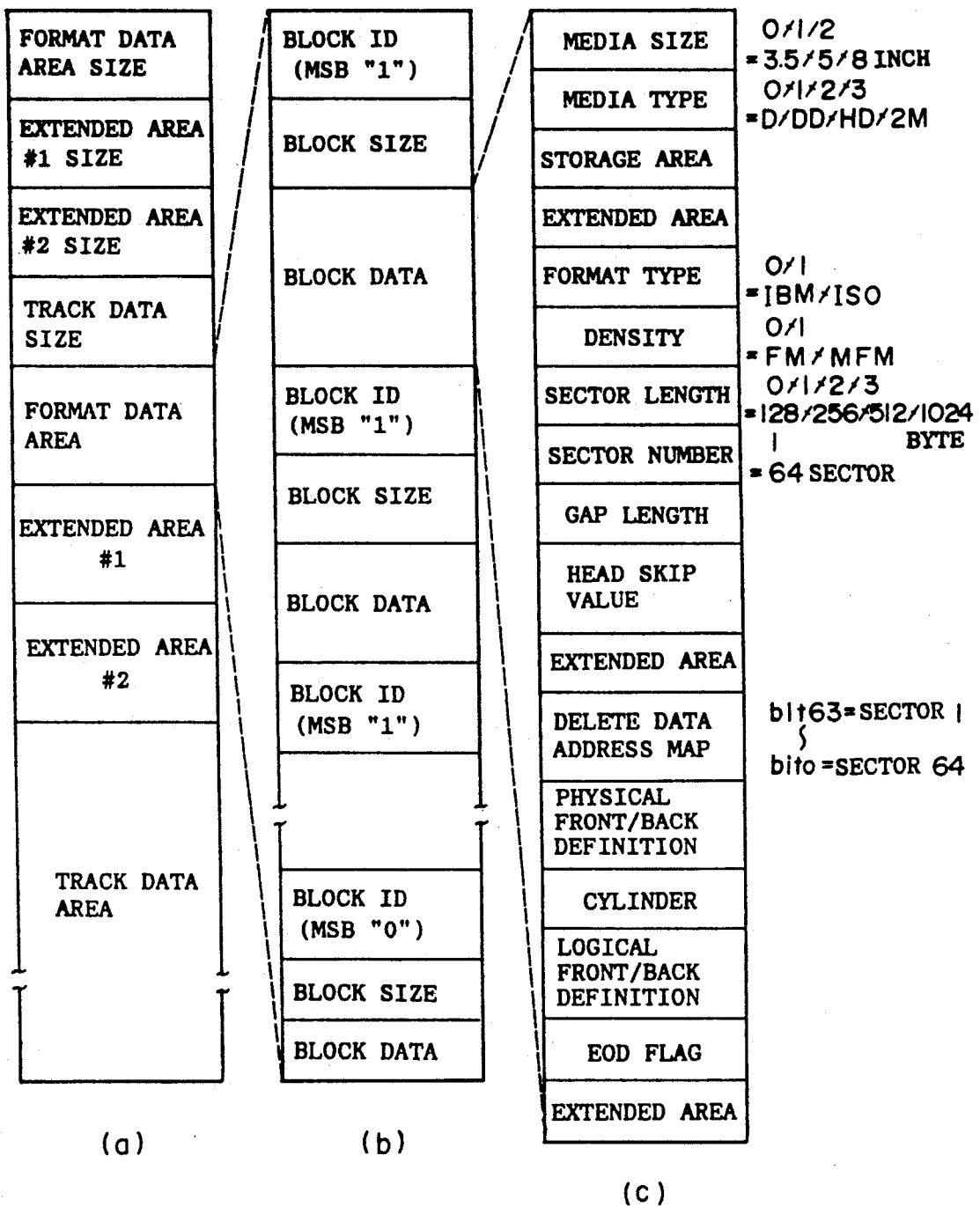
FIG. 5 shows a detailed data configuration of data format used in an embodiment of the present invention.

As shown in FIG. 5(a), the data portion of the I-Frame of normal data consists of format data area size, extended area #1 size, extended area #2 size, track data size, format data area, extended area #1, extended area #2 (all of which correspond to the FD header portion shown in FIG. 4F) and track data area (which corresponds to the FD data portion shown in FIG. 4F). Herein, the track data area contains the data of one track of FD.

As shown in FIG. 5(b), the format data area contains several blocks, wherein each block consists of block ID for defining the block, block size for designating the size of block, and block data. In each block, the MSB of the block ID is set at "1" if another block is added to the current block. If not, representing that the current block is the last block, this MSB is set at "0".

One of block data includes several pieces of information as shown in FIG. 5(c). Herein, "media size" designates the size of FD. In response to the FD size, i.e., 3.5/5/8 inches, this media size is set at 0/1/2. Next, in response to the storage density of FD, i.e., D/DD (double density track)/HD (high density track)/2M (high density track corresponding to FD having an un-format storage capacity of 2 Mega-byte), the media type is set at 0/1/2/3. In response to the storage side, i.e., one-sided/double-sided storage, the storage area information is set at 0/1. In response to the storage format, i.e., IBM/ISO formats, the format type is set at 0/1. In response to the storage type, i.e., FM/MFM, the density information is set at 0/1, wherein FM denotes the single storage density and MFM denotes the double storage density. The sector length information represents the number of bytes included in one sector. In response to the number of bytes, i.e., 128/256/512/1024 bytes, this sector length is set at 0/1/2/3. The gap length information represents the physical length of the un-used area, i.e., gap, formed between two sectors, while the head skip value is used to designate the length of the gap by which the head is skipped. If such gap length is un-known, the head skip value is set at (FF)H. The extended area is formed next to the area of head skip value. Then, the delete data address map is used to designate whether or not each of first to sixty-fourth sectors can be used.

The physical front/back definition information represents which physical side, i.e., front side or back side of the FD, the current track is physically on positioned. The cylinder number represents the number of tracks to be existed from the outermost track of the FD. The logical front/back definition information represents which logical side the current track is logically positioned on. More specifically, according to the needs, the user defines the front/back sides of the FD arbitrarily. Therefore, the above-mentioned logical side represents the front/back sides which are defined by the user. Such definition information is transferred to the receive-side FD transfer unit, so that the receive-side can access to the FD by use of the same logical front/back definition which is set at the transmit-side. Next, EOD (i.e., end-of-data) flag representing the end of data of one block and the extended area are formed.

In the receive-side FD transfer unit, the I-Frame of normal data corresponding to first track of the transmit-side FD is accumulated in the receive buffer 16 under control of the LAP-B controller 15 (see "RECEIVE ①" shown in FIG. 7(a)). When accumulating the I-Frame of normal data, determination is made based on the MSB of transfer mode information whether or not the transfer data is in the compressed format. In this case, the MSB of transfer mode information is set corresponding to the compressed format, so that the output of receive buffer 16 is supplied to the data expansion portion. Based on the LSB of transfer mode information, a determination is made whether or not the verify operation is required. If a determination is made that the verify operation is required, an execution command of the verify operation is supplied to the FDC 3. Thus, at every data writing timing, the FDC 3 collates the data to be written into the FD with the data which has been written into the FD by every track. Meanwhile, the data length in the I-Frame of normal data is set in a data counter (not shown). Therefore, the count value of the data counter is decremented every time one data is inputted into the receive buffer 16. When this count value becomes equal to zero, a determination is made that the receive buffer 16 receives all of the data in the I-Frame of normal data corresponding to the first track.

When the above-mentioned data receiving operation is carried out well, RR command (i.e., receive ready command) is transferred to the transmit-side FD transfer unit. In contrast, when the data receiving operation is not carried out well, re-transmit request command REJ is transferred to the transmit-side FD transfer unit by every HDLC-Frame, so that each HDLC-Frame is re-transmitted. Thus, a security check is made to the transfer operation of each HDLC-Frame by the LAP-B protocol.

When completely receiving the I-Frame of normal data, the data expansion portion 17 performs a data expansion on the FD data portion (i.e., compressed 1st-track-data) of the I-Frame of normal data stored in the receive buffer 16, so that its result is written into the temporary buffer 18 (see "EXPANSION TRANSFER ①" in FIG. 7(b)). In the FD header portion of the I-Frame of normal data, the first data in the format data area (see FIG. 5) is stored in a control register (not shown) as control information to be used when the FDC 3 writes the data in the FD. When completing "EXPANSION TRANSFER ①", the data stored in the temporary buffer 18 is written into the read/write buffer #0, which can be used at the current timing, (see "WRITE ①" in FIG. 7(c)), so that the processor 5 sends a write request to the FDC 3. Then, 1st-track-data is written into the FD under control of the FDC 3. Thereafter, the FDC 3 returns a write completion to the processor 5.

In the transmit-side FD transfer unit, when the I-Frame of normal data corresponding to the first track is completely transmitted (see "TRANSMISSION ①" in FIG. 6(d) and the data compression process is completely performed with respect to the second track (see "COMPRESSION TRANSFER ②" in FIG. 6(b)), the transmit-side system produces the I-Frame of normal data of which the FD data portion corresponds to the compressed 2nd-track-data, so that this I-Frame of normal data is written into the transmission buffer 14. Then, as described before, this I-Frame of normal data is inputted into the LAP-B controller 15, from which it is transmitted as the HDLC-Frame (see "TRANSMISSION ②" in FIG. 6(d)). As similar to the foregoing case of the first track, the receive-side FD transfer unit receives the I-Frame of normal data corresponding to the second track (see "RECEIVE ②" in FIG. 7(a)). Then, the FD data portion of the I-Frame of normal data is expanded (see "EXPANSION TRANSFER ②" in FIG. 7(b)), and the expanded data is written into the read/write buffer #1 (see "WRITE ②" in FIG. 7(d)). Similarly, thereafter, since the FD stored data is transferred by every track. As described heretofore, because the data of each track is transferred at once, it is possible to improve the efficiency of performing the data compression in the transmit-side and data expansion in the receive-side. Even if the transmit-side FD is partially subject to the "protect" so that some data is dropped from the transfer data, it is possible to manage the storage state of the data of each track in the receive-side FD.

When completing the operation of reading the data from the FD in the transmit-side FD transfer unit, this transmit-side FD transfer unit transfers the I-Frame of normal data to the receive-side FD transfer unit, wherein the I-Frame of normal data includes the end-of-data EOD as its FD data portion. Thus, the end-of-data EOD is written into the receive-side FD as the last data. Then, the receive-side FD transfer unit transfers the RR response to the transmit-side FD transfer unit.

Thereafter, the transmit-side FD transfer unit transmits an I-Frame of end request to the receive-side FD transfer unit, wherein this I-Frame of end request consists of ID, function code FC=(03)H and end status code as shown in FIG. 4D. Then, the receive-side FD transfer unit transfers an I-Frame of end response to the transmit-side FD transfer unit, wherein this I-Frame of end request consists of ID, function code FC=(04)H and end response code as shown in FIG. 4E. Thus, the ending procedure for the data transfer is completed. Thereafter, the transmit-side FD transfer unit sends a disconnection command DISC.P to the receive-side FD transfer unit. Responsive to DISC.P, the receive-side FD transfer unit returns a response UA.F to the transmit-side FD transfer unit, so that the data link will be terminated. Then, B channel is disconnected.

[C] Modifications

The above-mentioned embodiment is concerned with the case where the data transfer is made from the receive-side FD to the transmit-side FD. In the case where either the receive-side station or the transmit-side station has a large-scale memory to which a high-speed access can be made, it is possible to modify the present invention to improve its data transfer performance as described below.

More specifically, in the receive-side station, the compressed data to be transferred from the transmit-side station are directly accumulated in the large-scale memory which is built in or externally coupled to the receive-side station. Then, according to the needs, the compressed data read from the large-scale memory is expanded, and written into the storage medium such as the FD by each track. This operation can reduce the data transfer period.

On the other hand, in the case where the large-scale storage medium is built in or externally coupled to the transmit-side station, the data transfer can be made with relatively short period of time. More specifically, the transmit-side station compresses the transmission data and also compresses information concerning the designated transmission start time, transmission destination and transmission data, which are stored in the large-scale storage medium, so that the data transfer is made at the designated transmission start time. According to such transmission method, it is possible to automatically perform the data transfer during the desirable night time except the daytime when the line is full. Since the data transfer can be automatically made during the night time, the present invention can offer a freedom of degree to the user with respect to the data transfer.

As described heretofore, this invention may be practiced or embodied in still other ways without departing from the spirit or essential character thereof. Therefore, the preferred embodiment described herein is illustrative and not restrictive, the scope of the invention being indicated by the appended claims and all variations which come within the meaning of the claims are intended to be embraced therein.

What is claimed is:

1. A data transfer method wherein a data link corresponding to a B channel is established between first and second stations which are connected together by digital network corresponding to an integrated service digital network system so that a transmission control is made on a data transfer operation performed between said first and second stations in accordance with a predetermined LAP-B protocol, comprising the steps of:

transmitting a first information frame, representing a data transfer request, from said first station which functions as a transmit-side station to said second station which functions as a receive-side station;

transmitting a second information frame, representing a response to said data transfer request, to said first station from said second station which is now ready to perform a data transfer in response to said data transfer request;

sequentially reading out data from a first storage medium provided at said first station in response to said second information frame, compressing the read-out data, and then transferring the compressed data and an information frame of normal data, having information representing a data length and a transmission data number with respect to said compressed data, to said second station;

extracting said compressed data from said information frame of normal data received by said second station, expanding said compressed data, and writing the expanded data into a second storage medium provided at said second station;

transferring a third information frame for end request of data transfer to said second station from said first station which completes the data transfer;

transferring a fourth information frame for end response of data transfer to said first station from said second station which responds to the end request of data transfer;

thus, terminating the data link corresponding to B channel.

2. A data transfer method as defined in claim 1, further including dividing a whole storage area of said storage medium into plural storage blocks so that a predetermined overhead time is required when performing a read-out operation or a writing operation with respect to two or more different storage blocks, said first station performing a read-out operation and a data compression on said first storage medium with respect to each storage block so that said first station transfers said information frame of normal data having information representing a number of storage block, compressed data and its data length.

3. A data transfer method as defined in claim 1 wherein said first station transfers said information frame of normal data including control information representing a kind and a storage format of said first storage medium other than said information representing said compressed data and its data length, while said second station controls a read-out operation to be performed on said second storage medium in accordance with said control information.

4. A data transfer method as defined in claim 1 wherein said first station performs the read-out operation, data compression and transfer operation in a parallel manner, while said second station performs a receiving operation, a data expansion and a writing operation in a parallel manner.

5. A data transfer method as defined in claim 1 wherein before transmitting said first information frame representing said data transfer request, said first station starts to perform the read-out operation, data compression and generation of said information of normal data with respect to first data read from said first storage medium.

6. A data transfer method as defined in claim 1 wherein a large-scale storage medium is provided for said second station so that said large-scale storage medium accumulates said compressed data transferred thereto from said first station as it is transferred, whereby said second station expands said compressed data and then outputs it with respect to predetermined number of blocks of said second storage medium.

7. A data transfer method as defined in claim 1 wherein a large-scale storage medium is provided for said first station so that said large-scale storage medium accumulates said compressed data and information representing a designated transmission start time, a transmission destination and transmitting data in advance, and said first station starts to perform the data transfer based on said information at the designated transmission start time.

8. A method for transferring data comprising the steps of:
a. establishing a data link corresponding to B channel between first and second stations over an integrated service digital network system;
b. exchanging a first information frame representing a data transfer request in accordance with a predetermined LAP-B protocol, between said first station which functions as a transmit-side station and said second station which functions as a receive-side station;
c. reading out data from a first storage medium provided at said first station in response to said first information frame;
d. compressing the read-out data;
e. transferring the compressed data and a second information frame of normal data, having information representing a data length and a transmission data number with respect to the compressed data, to said second station;
f. writing data corresponding to the second information frame into a second storage medium provided at said second station; and
g. exchanging a third information frame representing an end request of data transfer in accordance with a predetermined LAP-B protocol, between said first and second stations.

9. A data transfer method as defined in claim 8, further including dividing a whole storage area of said storage medium into plural storage blocks so that a predetermined overhead time is required for performing a read-out operation or a writing operation with respect to two or more different storage blocks, said first station performing a read-out operation and a data compression on data from said first storage medium with respect to each storage block, and said first station transferring to said second station said information frame of normal data having information representing a number of storage block, compressed data and its data length.

10. A data transfer method as defined in claim 9, wherein said first station transfers said information frame of normal data, including control information representing a kind and a storage format of said first storage medium, other than information representing said compressed data and its data length, while said second station controls a read-out operation to be performed on said second storage medium in accordance with said control information.

11. A data transfer method as defined in claim 10, wherein said first station performs the read-out operation, data compression and transfer operation in a parallel manner while said second station performs a receiving operation, a data expansion and a writing operation in a parallel manner.

12. A data transfer method as defined in claim 11, wherein, before transmitting said first information frame representing said data transfer request, said first station starts to perform the read-out operation, data compression and generation of said information frame of normal data with respect to the first data read from said first storage medium.

13. A data transfer method as defined in claim 12, wherein a large-scale storage medium is provided for said second station, and said large-scale storage medium accumulates the compressed data transferred thereto from said first station as it is transferred, and said second station expands the compressed data and then outputs the expanded data with respect to a predetermined number of blocks of said second storage medium.

14. A data transfer method as defined in claim 13, wherein a large-scale storage medium is provided for said first station, and said large-scale storage medium accumulates the compressed data and information representing a designated transmission start time, a transmission destination, and transmitting data in advance, and said first station starts to perform a data transfer based on said information at the designated transmission start time.

* * * * *

UNITED STATES PATENT AND TRADEMARK OFFICE
CERTIFICATE OF CORRECTION

PATENT NO. : 5,282,208
DATED : January 25, 1994
INVENTOR(S) : Akira Takayama, et al.

It is certified that error appears in the above-indentified patent and that said Letters Patent is hereby corrected as shown below:

Column 8, line 10: "on positioned" should read --positioned on--

Column 11, line 49, Claim 5: after "information" insert --frame--

Signed and Sealed this

Thirtieth Day of August, 1994

*Attest:*

BRUCE LEHMAN

*Attesting Officer*     *Commissioner of Patents and Trademarks*